(12) United States Patent
Creech

(10) Patent No.: US 10,215,268 B2
(45) Date of Patent: Feb. 26, 2019

(54) ACTUATOR ASSEMBLY WITH AN INTEGRATED SENSOR AND A BIASING MEMBER

(71) Applicant: Dana Automotive Systems Group, LLC, Maumee, OH (US)

(72) Inventor: Michael Z. Creech, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 177 days.

(21) Appl. No.: 15/470,247

(22) Filed: Mar. 27, 2017

(65) Prior Publication Data

US 2017/0276224 A1    Sep. 28, 2017

Related U.S. Application Data

(60) Provisional application No. 62/314,065, filed on Mar. 28, 2016.

(51) Int. Cl.
| | |
|---|---|
| *F16H 48/34* | (2012.01) |
| *F16H 48/08* | (2006.01) |
| *F16H 48/24* | (2006.01) |
| *G01D 5/14* | (2006.01) |
| *H01F 7/18* | (2006.01) |

(52) U.S. Cl.
CPC ............. *F16H 48/34* (2013.01); *F16H 48/08* (2013.01); *F16H 48/24* (2013.01); *G01D 5/145* (2013.01); *G01D 5/147* (2013.01); *H01F 7/1844* (2013.01); *F16H 2048/346* (2013.01); *H01F 2007/185* (2013.01)

(58) Field of Classification Search
CPC ....................................................... F16H 48/34
See application file for complete search history.

(56) References Cited

U.S. PATENT DOCUMENTS

| | | | |
|---|---|---|---|
| 6,827,661 | B2 | 12/2004 | Fusegi et al. |
| 6,959,799 | B2 | 11/2005 | Fusegi et al. |
| 6,966,863 | B2 | 11/2005 | Teraoka et al. |
| 7,247,118 | B2 | 7/2007 | Haruki et al. |
| 7,602,271 | B2 | 10/2009 | York et al. |
| 7,682,279 | B2 | 3/2010 | Donofrio et al. |
| 7,887,450 | B2 | 2/2011 | Fusegi et al. |

(Continued)

FOREIGN PATENT DOCUMENTS

WO    WO-2015175847 A1 * 11/2015    ............... G01D 5/04

*Primary Examiner* — Tisha D Lewis
(74) *Attorney, Agent, or Firm* — Marshall & Melhorn, LLC

(57) ABSTRACT

An actuator assembly with a sensor system that is less sensitive to run-out out of moving parts. The sensing system includes a magnet holding plate, a pressure plate, a sensor target and a sensor assembly. The magnet holding plate includes an aperture defining an inner surface, an outer surface, a raised portion along the inner surface, a biasing member positioned along the inner surface in the raised portion, and a flange positioned on the outer surface. The pressure plate includes an outer surface of the pressure plate is positioned underneath the raised portion of the magnet holding plate, axially between the raised portion and the biasing member. The sensor target is attached to the flange of the magnet holding plate. The sensor assembly includes a sensor and a sensor housing positioned radially outward from the pressure plate and magnet holding plate.

16 Claims, 4 Drawing Sheets

(56) References Cited

U.S. PATENT DOCUMENTS

| | | |
|---|---|---|
| 8,348,799 B2 | 1/2013 | Maruyama et al. |
| 2008/0182702 A1* | 7/2008 | Donofrio ............... B60K 23/04 475/235 |
| 2011/0046860 A1 | 2/2011 | Pinkos et al. |
| 2017/0052043 A1* | 2/2017 | Hernandez-Oliver ....................... G01D 5/2006 |

* cited by examiner

ACTUATOR ASSEMBLY WITH AN INTEGRATED SENSOR AND A BIASING MEMBER

RELATED APPLICATION

The present application claims priority to and the benefit from Provisional U.S. Patent Application Ser. No. 62/314,065 filed on Mar. 28, 2016. The content of the above-noted patent application is hereby expressly incorporated by reference into the detailed description of the present application

BACKGROUND

The present disclosure relates to a sensing system for an actuator assembly, more specifically, an actuator assembly used in a locking gear set of a motor vehicle.

Locking gear sets can switch between an engaged and disengaged state. Examples of such gear sets can include, but are not limited to, power takeoff units, and axle disconnects, or differentials, as are frequently found in a motor vehicle.

Engagement of a locking gear set can be effected by an actuator. In power takeoff units, axle disconnects, or differentials, the actuator is powered and signaled by the motor vehicle through a controller. As is known in the art, the actuator converts electrical current from the controller into mechanical force. For example, the flow of electrical current creates a magnetic field that moves a pressure plate of the actuator, and through mechanical structure engages or disengages the gear set.

A sensor can be used to relay information regarding the position of the actuator back to the controller. A position sensor provides a signal that is indicative of the position of the locking gear set. Positional sensors are generally of two types: mechanical or magnetic proximity Prior art mechanical positional sensors can have wear and mounting issues. Prior art magnetic proximity sensors can have accuracy problems based on run-out of moving parts. Interference caused by rapid rotation and may cause axial displacement of rotating components, resulting run-out that results in "noise" and error motions in regards to the sensors.

Accordingly, it would be desirable to provide an improved actuator assembly with a sensor system that is less sensitive to run-out out of moving parts.

SUMMARY

A sensing system for an actuator including a magnet holding plate, a pressure plate, a sensor target and a sensor assembly. The magnet holding plate includes an annular aperture defining a radially inner surface, a radially outer surface, a raised portion along the inner surface, a biasing member positioned along the inner surface in the raised portion, and a flange positioned on the outer surface and extending perpendicular to the aperture. The pressure plate includes a radially outer surface and an aperture in the center thereof. The outer surface of the pressure plate is positioned underneath the raised portion of the magnet holding plate and axially between the raised portion and the biasing member. The sensor target is attached to the flange of the magnet holding plate. The sensor assembly includes a sensor and a sensor housing positioned radially outward from the pressure plate and magnet holding plate.

BRIEF DESCRIPTION OF THE DRAWINGS

The above, as well as other advantages of the present disclosure, will become readily apparent to those skilled in the art from the following detailed description when considered in the light of the accompanying drawings in which.

DETAILED DESCRIPTION OF THE PREFERRED EMBODIMENTS

It is to be understood that the preferred embodiments may assume various alternative orientations and step sequences, except where expressly specified to the contrary. It is also to be understood that the specific devices and processes illustrated in the attached drawings, and described in the following specification are simply exemplary embodiments of the inventive concepts. Hence, specific dimensions, directions or other physical characteristics relating to the embodiments disclosed are not to be considered as limiting.

Figure 1:
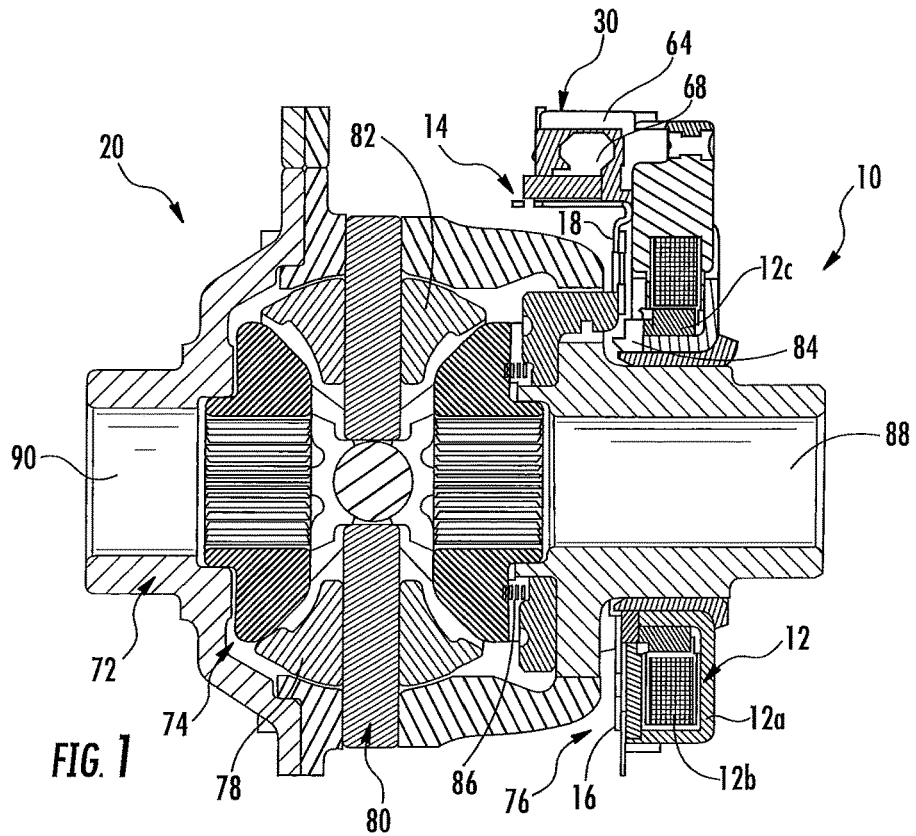
FIG. 1 is a cross-sectional view of a preferred embodiment a locking gear set.

Referring now to FIG. 1, an actuator assembly 10 and a differential assembly 20 according to a preferred embodiment are depicted. The actuator assembly 10 includes a solenoid 12 and a sensing system 14. The solenoid 12 includes a housing 12a, an electromagnetic coil 12b, and an armature 12c. The solenoid 12 is non-rotating. In some embodiments, the coil 12b includes coiled wires, preferably molded in a resin.

The armature 12c is linearly movable and driven by the solenoid 12. In some embodiments, the armature 12c is positioned radially inward from the electromagnetic coil 12b. The solenoid coil 12b generates a magnetic flux which in turn moves the armature 12c. The housing 12a partially encloses the magnetic core 12b.

The magnetic core 12b and the housing 12a form a partial magnetic circuit around the coiled wires. The armature 12c completes the enclosure of the magnetic core, thereby completing the magnetic circuit. A power source and a controller (not shown) can be connected with the solenoid 12. Therefore, the coiled wires are coupled to the controller which operates to selectively energize and de-energize the coil 12b and, thus, move the armature 12c.

The sensing system 14 includes a spinning pressure plate 16, a magnet holding plate 18 and a sensor assembly 30 as shown in FIG. 1.

Figure 4:
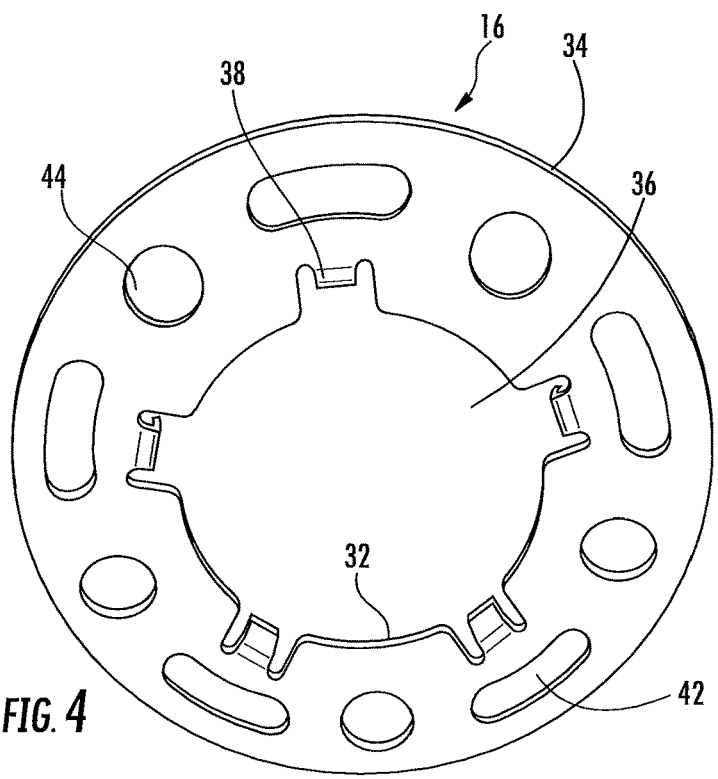
FIG. 4 is a top view of a preferred embodiment of a spinning pressure plate.

In one embodiment, as shown in FIG. 4, the pressure plate 16 is generally a flat circular plate with a radially inner surface 32, a radially outer surface 34 and a circular aperture 36 in the center thereof. In one embodiment, the pressure plate 16 is a composed of a non-magnetic material including, but not limited to, stainless steel. The aperture 36 allows the pressure plate 16 to be mounted on the differential assembly 20 or other assembly and rotate therewith.

In some embodiments, the pressure plate 16 can also include a set of tabs 38 positioned along the inner surface 34 that extend perpendicular to the aperture 36. As depicted in FIG. 4, the pressure plate 16 includes five tabs; however, the number of tabs can be greater or less than five depending on the size of the aperture 36. The tabs 38 are used to secure the pressure plate 16 to the differential assembly 20, locking gear set 70 or other rotating assembly.

In some embodiments, the pressure plate 16 can include additional apertures 42, 44 positioned radially between the inner surface 34 and outer surface 34 to allow an oil or lubrication fluid to move therein. The size, shape and number of apertures 42, 44 can vary depending on the level and viscosity of oil required by the actuator assembly 10.

Figure 5:
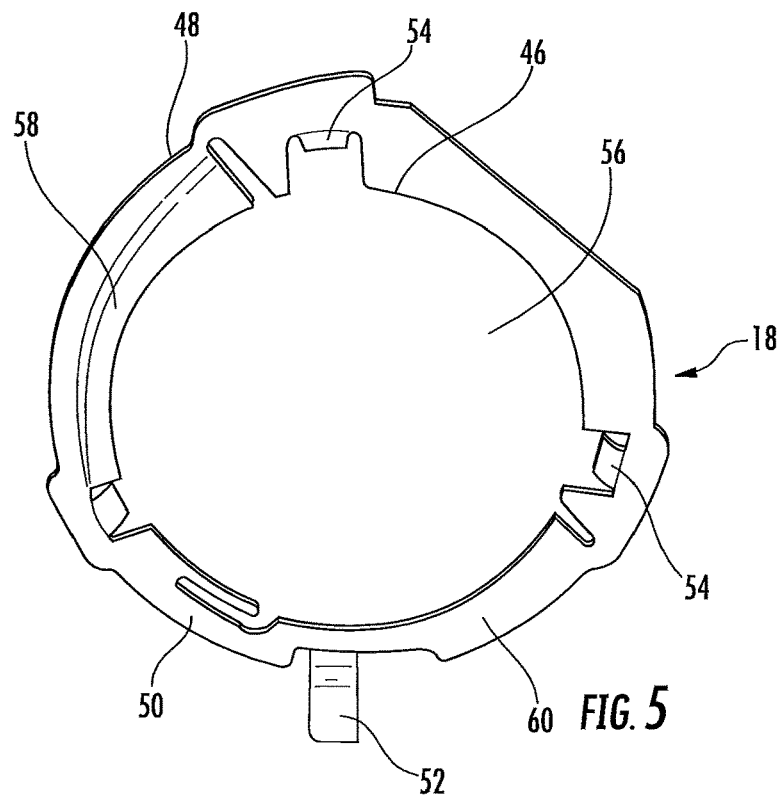
FIG. 5 is a top view of a preferred embodiment of a magnet holding plate.

The sensing system 14 further includes a magnet holding plate 18, as shown in FIG. 5, having a generally circular radially inner surface 46, a radially outer surface 48, a biasing member 50, a flange 52 and a set of tab portions 54. The magnet holding plate 18 has a generally circular aperture 56 in the center thereof.

The inner surface 46 of the magnet holding plate 18 includes a set of raised portions 58, 60 that create an axially restraint along the inner surface 46. As depicted in FIG. 5, the inner surface 46 includes two raised portions 58, 60, but additional raised portions can be added depending on the size of the magnet holding plate 18.

A set of tab portions 54 are positioned along the inner surface 46 and include a plurality of tabs 54 that extend perpendicular to the aperture 56 and allows the magnet holding plate 18 to maintain its alignment in while translating axially in the sensing system 14.

The flange 52 is positioned along outer surface 48 of the magnet holding plate 18 and extends perpendicular to the outer surface 48 of the magnet holding plate 18 in the opposite direction as the set of tab portions 54. In some embodiments, as shown in FIGS. 2-5, the flange 52 is positioned along the outer surface 48 in a raised portion 60; however, the flange 52 location along the outer surface 48 of the magnet holding plate 18 may vary.

Figure 6:
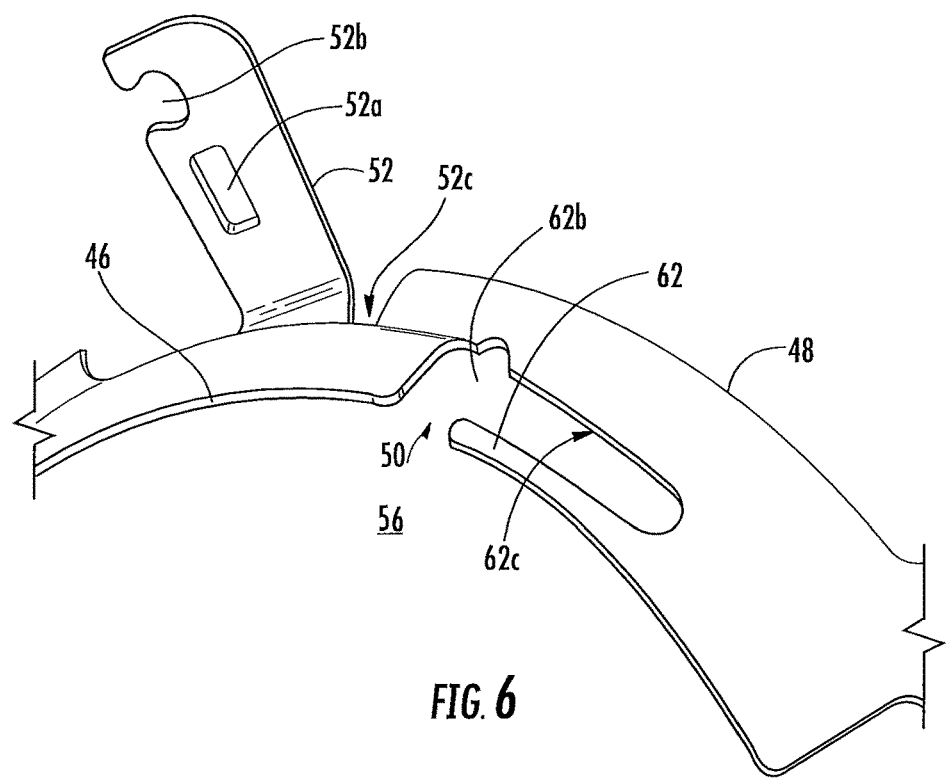
FIG. 6 is a detailed section view of the biasing member on the magnet holding plate of FIG. 5.
Figure 7:
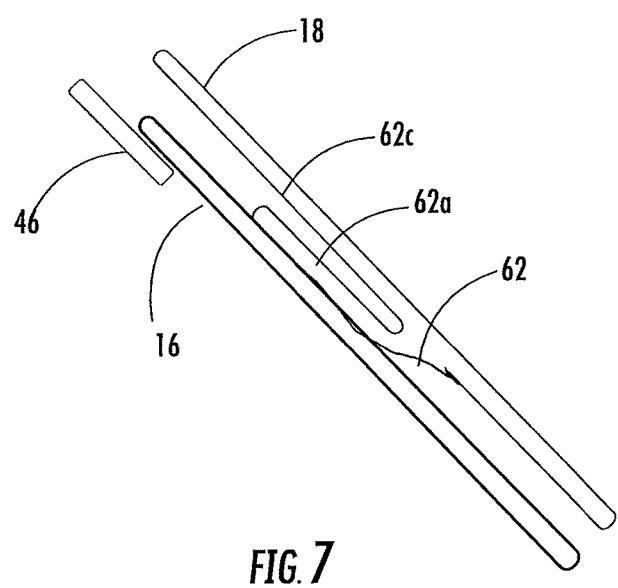
FIG. 7 is a schematic section view of a spinning pressure plate and the biasing member on a magnet holding plate according to a preferred embodiment.

The biasing member 50 is positioned along the inner surface 46 of the magnet holding plate 18 in a raised portion 58, 60. In one embodiments, as shown in FIGS. 6-7, the biasing member 50 includes a spring or elastic portion 62 that extends along the inner surface 46 and creates a gap 62b between the inner surface 46 of the magnet holding plate 18 and the raised portion 58, 60. As depicted in FIGS. 6-7, the magnet holding plate 18 includes one biasing member 50; however, additionally biasing members 46 can be added symmetrically along the inner surface 46 of the raised portions 58, 60 depending on the amount of force needed to be provided by the biasing member 50.

Figure 3:
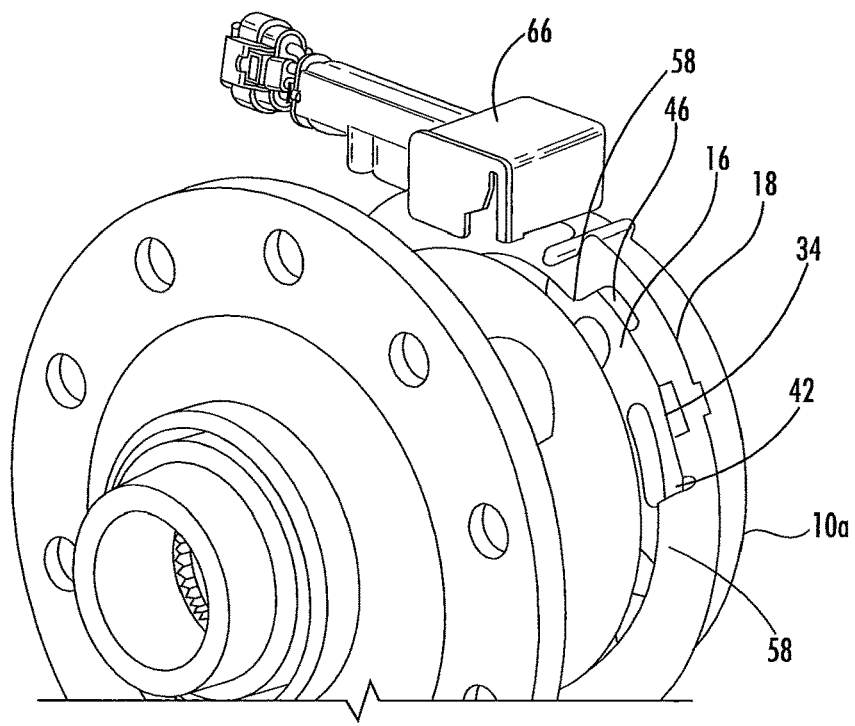
FIG. 3 is a partial section view of a preferred embodiment of a locking gear set, sensing system and actuator assembly.

As depicted in FIG. 3, the pressure plate 16 is positioned inside the magnet holding plate 18. The pressure plate 16 mates with the inner surface 46 of the magnet holding plate 18 such that the outer surface 34 of the pressure plate 16 slides underneath raised portions 58, 60 of the magnet holding plate 18 and is generally axially retained by the raised portions 58, 60 as shown in FIG. 3. Thus, the size of the aperture 56 must be sufficient for the pressure plate 16 to fit therein.

As depicted in FIG. 7, when the sensing system 14 is assembled, the pressure plate 16 is positioned between the axially between the raised portion 58, 60 and the spring portion 62 of the biasing member 50. The spring portion 62 provides an axially biasing force that urges the pressure plate 16 axially toward the raised portions, 58, 60 and the raised portions 58, 60 prevent the pressure plate 16 from being moved axially way from the magnet holding plate 18. Thus, the raised portions 58, 60 and the biasing member 50 axially limit the movement of the pressure plate 16 within the sensing system 14.

In one embodiment, as shown in FIG. 6, the spring portion 62 of the biasing member 50 has a general u-shaped configuration with a raised outer side portion 62c. The biasing member 50 generally extends along circular aperture 56 of inner surface 46 of magnet holding plate 18. The spring portion 62b acts as a spring allowing the spring portion 62 to move up and down slightly with the axial movement of the pressure plate 16 while still maintaining a force which urges the pressure plate 16 underneath the raised portions 58, 60 of the magnet holding plate 18. This limits the amount of axial clearance space the pressure plate 16 has to move within the raised portions 58, 60. By limiting the clearance space, the pressure plate 16 remains in alignment with the sensing assembly 30. The spring biasing member 50 as shown in FIGS. 6-7 is one example of a biasing member and it should be understood that other examples and structures of biasing members are allowed.

As shown in FIG. 1, the sensing system 14 further includes the sensor assembly 30 for sensing the engagement of actuator assembly 10. The sensor assembly 30 can be mounted onto a stationary part of the actuator assembly 10. The sensor assembly 30 includes a sensor 64 and a sensor housing 66. In some embodiments, the sensor 64 is a magnetic position sensor including, but not limited to, a Hall sensor. The sensor 64 is positioned inside the sensor housing 66.

In some embodiments, the sensor assembly 30 is positioned radially outward from the actuator assembly, spinning pressure plate 16 and magnet holding plate 18 such that it can detect the presence of a sensor target 68.

Figure 2:
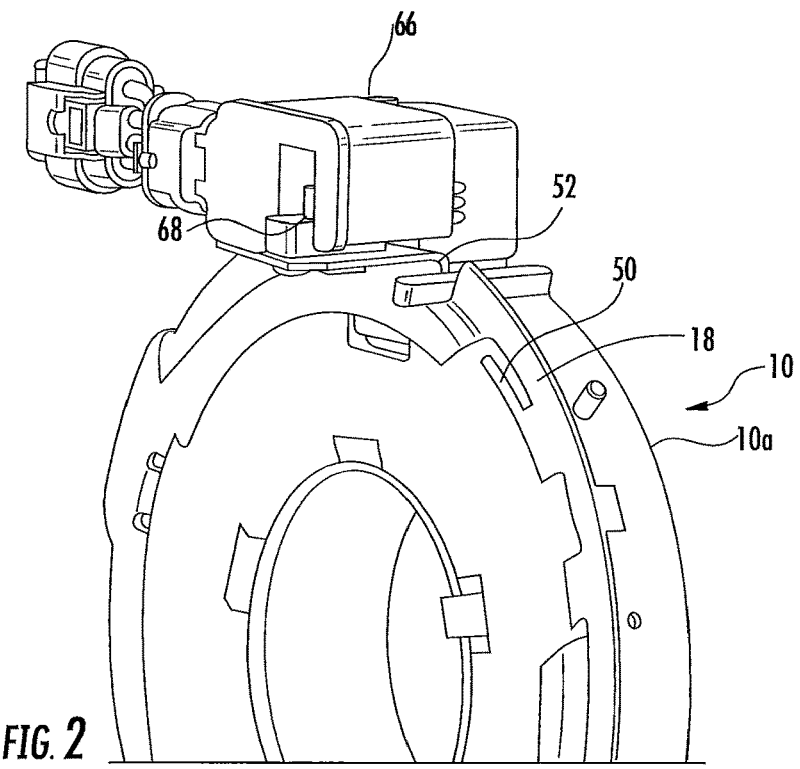
FIG. 2 is a partial perspective view of a preferred embodiment of an actuator assembly and sensing system.

In one embodiment, as shown in FIG. 6, the flange 52 extends perpendicular from the outer surface 48 of the magnet holding plate 18. The flange 52 can have one or more apertures 52a into which the sensor target 68 can be inserted therein or attached thereto as shown in FIG. 2. Additionally, the flange 52 can have one or more apertures 52b for attaching the magnet holding plate 18 to the sensor assembly 30. The sensor target 68 can be attached in any appropriate manner including, but not limited to, mechanical means such as clips or adhesives, as shown in FIG. 2. In one embodiment, the sensor 64 is a Hall sensor, the sensor target 68 is a magnet and the Hall sensor 64 can detect the magnetic flux between the sensor 64 and the sensor target 68 changes in intensity. The sensor 64 is positioned in the sensor assembly 30 such that it is in alignment with the sensor target 68, i.e. the sensor 64 can detect the position of the sensor target 68.

In some embodiments, the actuator assembly 10 includes an actuator housing 10a which the magnet holding plate 18 is movably attached there to as depicted in FIG. 3. The magnet holding plate 18 may have an aperture 52c on the outer surface 48 thereof, adjacent the flange 52 in which a portion of the actuator housing 18a is positioned therein. The actuator housing 10a limits the radial movement of the magnet holding plate 18.

When the solenoid 12 is supplied power and activated, the pressure plate 16 rotates and moves axially. By moving axially, the pressure plate 16 in turn applies of force to a locking gear set 70.

In addition, the pressure plate 16 drives the magnet holding plate 18. The magnet holding plate 18 is attached to the pressure plate 16 such that when the pressure plate 16 moves the locking gear set 70 into engagement, the magnet holding plate 18 and the sensor target 68 attached to the magnet holding plate 18 move axially. The position of the sensor target 68 is detected by the sensor 64 and, thus, corresponds to the position of the locking gear set 70.

In one embodiment, the sensor target 68 is a magnet and the sensor 64 is a Hall sensor, as the position of the sensor target 68 changes, the magnetic flux between the sensor 64 and the sensor target 68 changes in intensity. This change in magnetic flux by the sensor 64 thereby corresponds to the position of the locking gear set 70.

The pressure plate 16 can experience run-out causing it to move axially out of alignment with sensing system 14 as it rotates due to the speed at which is rotates. The biasing member 50 and the raised portions 58, 60 retain the pressure plate 16 in alignment with the sensing system 14 by creating a force which urges the pressure plate 16 to remain between the raised portions 58, 60 and biasing side portion 62 of the magnet holding plate 18. By limiting the axial movement of the pressure plate 16 due to run-out, the "noise" detected by the sensor 64 as a result of the run-out axial movement the pressure plate 16 is reduced increasing the accuracy of the sensing system 14 to detect the position of the locking gear set 70 based on the movement of the sensor target 68.

In one embodiment, the locking gear set 70 is attached to a differential assembly 20 as shown in FIG. 1. The actuator assembly 10 is used to place the differential assembly 20 in an open or locked condition. The differential assembly 20 may be utilized with a wide variety of components and is not intended to be specifically limited to the particular application described herein. The actuator assembly 10 may be used along with many types of differentials such as a bevel gear design including a limited slip differential.

The differential assembly 20 can be used for distributing a driving force generated by a power source to right and left axles 88, 90 of a motor vehicle. The differential assembly 20 includes a differential casing 72 which receives the driving force to rotate about an axis, a differential gear set 74 housed in the differential casing 72, a clutch 76 engaging with the differential gear set 74 to lock differential motion thereof, and the actuator assembly 10 for actuating the clutch 76.

In one embodiment, as shown in FIG. 1, the differential gear set 74 is of a bevel gear type generally made up of pinion gears 78, pinion shafts 80, and a pair of side gears 82. However, other types of gears such as a helical gear type or the other may be applied to the differential gear set 74. The pinion shafts 80 are secured to the differential casing 72 and rotatably support the pinion gears 78.

The differential assembly 20 can be rotatably mounted in an axle housing (not shown). The side gears 82 and pinion gears 78 are positioned in the differential casing 72. The clutch 76 is partially positioned inside differential casing 72 and is connected to the pressure plate 16 part of the sensing system 14 outside differential casing 72. The solenoid 12 is positioned outside the differential casing 72. In one embodiment, the solenoid 12 is positioned axially adjacent the clutch 76 and radially outward from the axles 88, 90.

The clutch 76 can selectively lock one of side gears 82 to differential casing 72. In one embodiment, the side gears 82 respectively have gear teeth that engage with gear teeth of the pinion gears 78 and splined inner bores to drivingly engage with the axles 88, 90, thereby transmitting the driving force from the pinion gears 78 to the axles 88, 90. As shown in FIG. 1, the teeth of one side gear are selectively engagable with teeth on a movable member 84 to form the clutch 76. The movable member 84 can axially move upon activation of the actuator assembly 10.

The solenoid 12 converts electrical current into a mechanical force and drives the linearly moveable member 84 that can engage the side gears 82 of the differential assembly 20. When magnetic flux is generated under control by the controller, the magnetic flux drives the armature 12c in the axial direction. The armature 12c actuates the movable member 84 which can engage with the side gear 82. Similarly, to disengage or lock the differential assembly 20, the current is discontinued to coil 12b and the magnetic field ceases to exist. A return spring 86 is positioned between the movable member 84 and the side gear 82 to urge the movable member 84 in a direction away from the side gear 82 when the clutch 76 is disengaged.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed:

1. A sensing system for an actuator, comprising:
   a magnet holding plate including an annular aperture defining a radially inner surface, a radially outer surface, a raised portion along the inner surface, a biasing member positioned along the inner surface in the raised portion, and a flange positioned on the outer surface and extending perpendicular to the aperture;
   a non-magnetic pressure plate having a radially outer surface and an aperture in the center thereof;
   a sensor target attached to the flange of the magnet holding plate; and
   a sensor assembly including a sensor and a sensor housing positioned radially outward from the pressure plate and magnet holding plate,
   wherein the outer surface of the pressure plate is positioned underneath the raised portion of the magnet holding plate, axially between the raised portion and the biasing member.

2. The sensing system of claim 1, wherein the biasing member includes a spring portion and a gap portion, wherein the outer surface of the pressure plate is positioned in the gap portion.

3. The sensing system of claim 2, wherein the spring portion is u-shaped.

4. The sensing system of claim 2, wherein the biasing member further comprises a raised outer side portion.

5. The sensing system of claim 1, wherein the sensor target is a magnet and the sensor is a Hall sensor.

6. The sensing system of claim 4, wherein the sensor assembly is positioned radially outward from the flange portion of the magnet holding plate.

7. The sensing system of claim 1, wherein the pressure plate is a flat, circular plate.

8. The sensing system of claim 1, wherein the flange is positioned on the outer surface of the raised portion.

9. An actuator assembly, comprising:
   the sensing system of claim 1;
   a movable member selectively connected to the sensing system; and
   a solenoid including a housing, a coil, and a linearly movable armature,
   wherein the solenoid is positioned radially inward from the sensor, and
   wherein the linearly movable armature is drivingly connected to the movable member.

10. The actuator assembly of claim 9, wherein the pressure plate selectively engages a locking gear set.

11. The actuator assembly of claim 9, wherein the magnet holding plate is axially movable within the actuator assembly.

12. The actuator assembly of claim 9, further comprising an actuator housing, wherein the magnet holding plate is movably attached to the actuator housing.

13. A differential assembly, comprising:
   the actuator assembly of claim 9;
   a differential gear set;
   a clutch including the movable member, wherein the clutch selectively engages the differential gear set and the movable member; and
   a differential casing housing the differential gear set and partially housing the clutch,
   wherein the differential assembly is drivingly connected to axles of a motor vehicle.

14. The differential assembly of claim 13, wherein the actuator assembly is outside the differential casing.

15. The differential assembly of claim 13, wherein the sensing system is positioned axially adjacent the differential gear set and radially outward from the axles.

16. The differential assembly of claim 13, wherein the axles of the motor vehicle are positioned inside the aperture of the pressure plate and the aperture of the magnet holding plate.

\* \* \* \* \*